E. W. HOFSTATTER.
SHOCK ABSORBER.
APPLICATION FILED JULY 29, 1918.
1,314,266.
Patented Aug. 26, 1919.
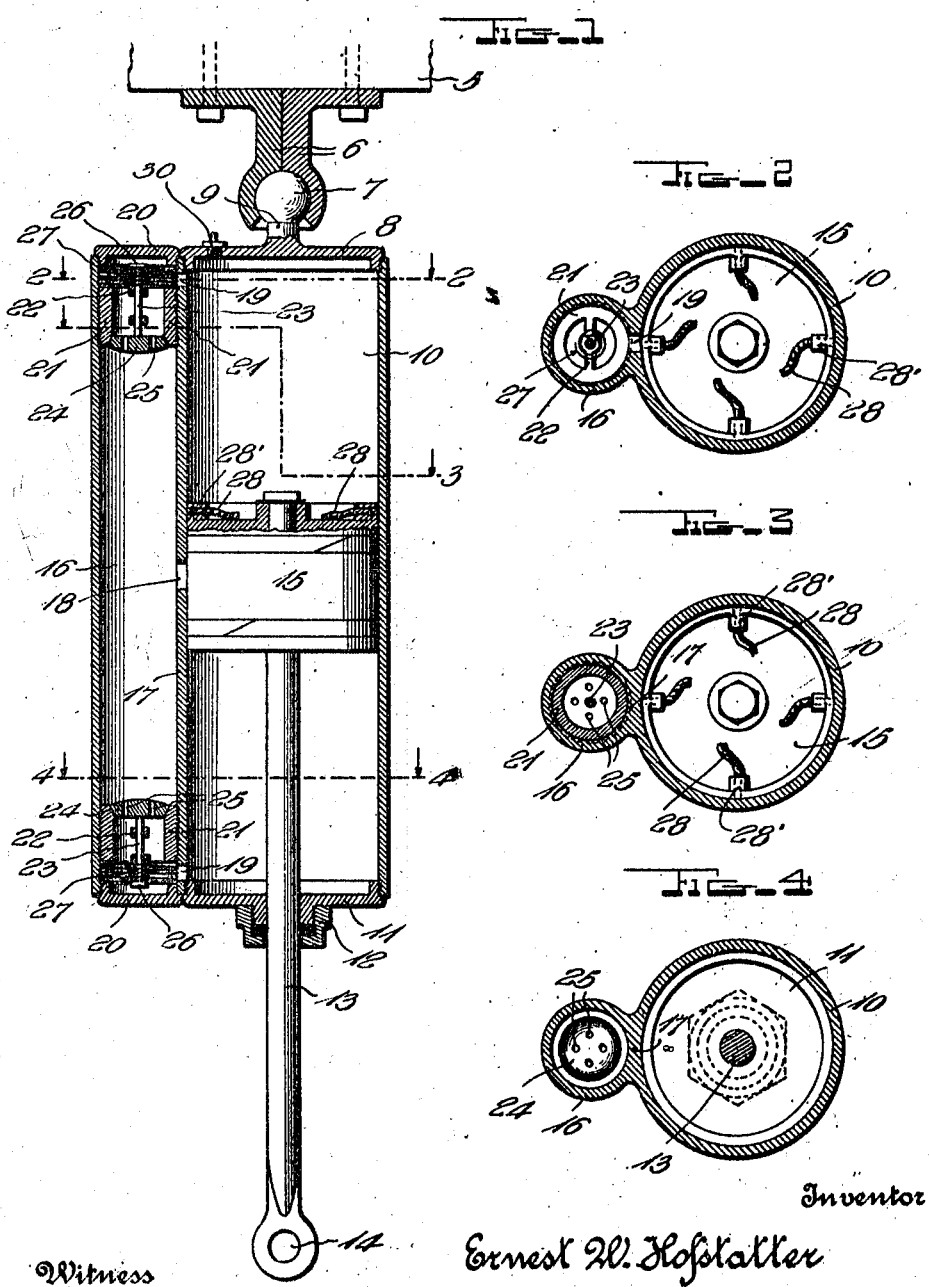
Inventor
Ernest W. Hofstatter
By H. B. Willson & Co.
Attorney
Witness

UNITED STATES PATENT OFFICE.

ERNEST W. HOFSTATTER, OF NYACK, NEW YORK.

SHOCK-ABSORBER.

1,314,266.  Specification of Letters Patent.  Patented Aug. 26, 1919.

Application filed July 29, 1918. Serial No. 247,259.

*To all whom it may concern:*

Be it known that I, ERNEST W. HOFSTATTER, a citizen of the United States, residing at Nyack, in the county of Rockland and State of New York, have invented certain new and useful Improvements in Shock-Absorbers; and I do declare the following to be a full, clear, and exact description of the invention, such as will enable others skilled in the art to which it appertains to make and use the same.

This invention relates to an improved shock absorber and recoil check, and it relates more particularly to an improved pneumatic device for cushioning or absorbing the shocks consequent to the traveling of automobiles and the like.

One of the objects of this invention is to provide a shock absorber which is equally effective to counteract a shock or motion in a given direction and in the opposite direction.

Another object is to provide a shock absorber which counteracts shocks by simultaneously creating a partial vacuum and a compression of air.

Another object is to provide a pneumatic shock absorber in which the air pressure is relieved immediately after the shock has been counteracted or cushioned, so as to allow free play of the main members in relation to one another, in the direction of motion, but to check the recoil of same until car and spring have returned to normal position.

Another object is to check recoil of the main members in either direction back to normal position.

Another object is to provide a device of this character which is of very simple construction, comparatively inexpensive, easy to apply, and not likely to get out of repair.

Other objects and advantages may become apparent to persons who read the following details of description in connection with the appended drawings in which—

Figure 1 is a longitudinal sectional view of a shock absorber constructed in accordance with one embodiment of this invention;

Fig. 2 is a transverse sectional view along the line 2—2 of Fig. 1;

Fig. 3 is a transverse sectional view along the line 3—3 of Fig. 1; and—

Fig. 4 is a transverse sectional view along the line 4—4 of Fig. 1.

Referring to the drawings in detail, in which similar reference characters correspond with similar parts throughout the several views, the reference numeral 5 represents a fragment of an automobile provided with a pair of socket elements 6 in which a ball 7 is mounted for free movement. Ball 7 is connected to a cap 8 by means of a neck 9, and the elements 7, 8 and 9 constitute a member which closes one end of a cylindrical air chamber 10. The other end of this air chamber is closed by means of a cylinder head or cap 11 which is provided with a stuffing box 12 through which a piston rod 13 extends. The piston rod is provided with a bearing element 14, adapted for connection with any moving part of the automobile or other vehicle, and a piston head 15 is secured on the other end of rod 13.

A cylinder or valve chamber 16 is preferably cast integrally with the cylinder 10, and coextensive therewith in length, and is spaced therefrom by means of a partition 17, the rod being provided with a central port 18 and end ports 19, these ports establishing communication between the cylinders or chambers 10 and 16. Caps or cylinder heads 20 close the ends of the chamber 16, these caps being preferably secured by means of screw threads thereon which engage with internal screw threads of cylinder 16. The screw-threaded portions of cylinder 16 extend inward a considerable distance beyond the ports 19, and valve members 21 are secured within the ends of cylinder 16 by means of these internal screw threads engaging with external screw threads which extend throughout the length of the valve members. Each of the cylindrical valve members 21 is provided with apertured guides 22 through which a valve stem 23 is mounted to reciprocate. On one end of each valve stem 23 is mounted an apertured valve closing member 24, the apertures 25 of which are relatively small, the aggregate capacity of the apertures 25 in each valve closing member 24 being less than the capacity of either of the ports 19, so that the air cannot escape through the apertures 25 as fast as it enters either of the cylindrical valve members through either of the ports 19; and therefore, each valve is opened and closed according to the amount and direction of air pressure thereagainst. Each valve stem 23 is provided with a head or shoulder 26, and a spring 27 is provided for each valve stem, said spring being interposed between the head 26 and the guides 22 of each valve. From the foregoing, it will be seen that each valve comprises one each of the elements 21, 23, 24, 26 and 27, and two of the guides 22, these valves being unitary structures which are capable of bodily attachment and detachment with relation to the cylinder 16, and therefore, in case of failure of one of the valves, it may be removed and replaced with comparatively little expense and inconvenience. This arrangement also avoids the delays which would be occasioned by the grinding of stationary valve seats.

The port 18 is of considerably greater capacity than either of the ports 19, but its size is such with relation to those of the piston 15 that the latter extends a considerable distance beyond said port 18, in all directions, when the piston is in its normal or central position. Therefore as air cannot pass through port 18 until the piston has moved a considerable distance in either direction along its action, and in thus moving along its action, the piston tends to create a vacuum in one of the cylinders 10 while pressing air in the other end thereof. However, the compressing of air is not confined to the cylinder 10, but also takes place in the cylinder 16, because the air passes through one of the ports 19 into the adjusting end of the cylinder 16 and then passes through the valve member 21 and moves the valve closure to its open position, since the ports 25 are insufficient to accommodate the air which passes through port 19. A portion of the air being compressed in the cylinder 16 passes through the apertures 25 in the opposite valve closure and passes thence through the other port 19 into the cylinder 10 so that the partial vacuum is somewhat relieved. The relief of the partial vacuum, however, is rather slow and gradual, and complete relief is not obtained until the piston has moved sufficiently far to open the port 18. In the meantime, the shock has been relieved by the combined pressure and partial vacuum acting upon the piston 15, and the greatest efficiency has thus been obtained; but now it is desirable that the recoil be checked and the piston allowed to return to normal position gradually, and this action is automatically effected through the medium of the apertured valve closing members 24, the air passing through the apertures 25 so as to find its equilibrium on opposite sides of the piston 15. In order that this device may be kept well lubricated without more than occasional attention, I form the upper end of the piston 15 with an apertured annular flange which combines with the horizontal upper end of the piston to form an oil-pan and wick holder. Wicks 28 are contained respectively in apertures through inwardly or radially extending bosses 28', and these wicks lead oil from the top of the piston to the convexed side thereof and to the contiguous wall of the cylinder, thereby thoroughly lubricating these working surfaces. A screw-plug 30 is provided in the upper working cylinder head for the oil to be introduced into the cylinder.

From the foregoing, it will be seen that I have provided a device of very simple and practical construction, and which is fully capable of attaining the foregoing objects.

Although I have described this embodiment of my invention very minutely, it is to be understood that my invention is not limited to these exact details of construction and arrangement of parts, but I am entitled to make such minor changes that do not constitute a departure from the inventive idea set forth in the foregoing description and following claims.

What I claim as my invention is:

1. A shock absorber comprising a main air chamber, a subsidiary air chamber, a partition separating said main and subsidiary chambers and provided with an intermediary port and end ports which establish a communication between said air chambers, a piston in said main air chamber, a pair of valve guides in opposite ends of said subsidiary chamber and alined with one another, and a pair of apertured valve-closing members each being disposed in one of said guides and operable to lesssen the flow of air by their movement away from one another, the apertures of said valve-closing members remaining open at all times.

2. A shock absorber comprising a main air chamber, a subsidiary air chamber, a partition separating said main and subsidiary chambers and provided with an intermediary port and end ports which establish a communication beteween said air chambers, a piston in said main air chamber and having an axial length sufficient to completely close said central port, and a pair of check valves each disposed in one end of said subsidiary chamber, said piston being normally positioned to close said central port and being capable of opening said central port when moved in either direction beyond its normal position.

3. A shock absorber comprising a main air chamber, a subsidiary air chamber, a partition separating said main and subsidiary chambers and provided with an intermediary port and end ports which establish a communication between said air chambers, a piston in said main air chamber, tubular members each formed with a valve seat and being removably secured in one end of said subsidiary chamber, between the said end ports, and valve closing members, each movably secured in one of said tubular members and normally seated in the adjacent valve seat and adapted to open the valve by its movement away from the adjacent one of said end ports and toward one another.

In testimony whereof I have hereunto set my hand.

ERNEST W. HOFSTATTER.